(12) United States Patent
Huang et al.

(10) Patent No.: US 11,295,539 B2
(45) Date of Patent: Apr. 5, 2022

(54) GENERATION METHOD OF HUMAN BODY MOTION EDITING MODEL, STORAGE MEDIUM AND ELECTRONIC DEVICE

(71) Applicant: SHENZHEN UNIVERSITY, Shenzhen (CN)

(72) Inventors: Hui Huang, Shenzhen (CN); Qian Zheng, Shenzhen (CN); Hanting Pan, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 17/265,659

(22) PCT Filed: Aug. 28, 2019

(86) PCT No.: PCT/CN2019/102937
§ 371 (c)(1),
(2) Date: Feb. 3, 2021

(87) PCT Pub. No.: WO2021/012352
PCT Pub. Date: Jan. 28, 2021

(65) Prior Publication Data
US 2021/0319629 A1     Oct. 14, 2021

(30) Foreign Application Priority Data

Jul. 23, 2019   (CN) .......................... 201910669994.9

(51) Int. Cl.
*G06T 19/20* (2011.01)
*G06N 3/08* (2006.01)
(Continued)

(52) U.S. Cl.
CPC .............. *G06T 19/20* (2013.01); *G06N 3/08* (2013.01); *G06T 13/40* (2013.01); *G06T 17/00* (2013.01)

(58) Field of Classification Search
None
See application file for complete search history.

(56) References Cited

U.S. PATENT DOCUMENTS

2011/0182469 A1    7/2011   Ji et al.
2017/0344829 A1    11/2017  Lan et al.
(Continued)

FOREIGN PATENT DOCUMENTS

| CN | 109584345 A | 4/2019 |
| CN | 110023962 A | 7/2019 |
| CN | 110033505 A | 7/2019 |

OTHER PUBLICATIONS

Kim, Vladimir G., et al. "Shape2pose: Human-centric shape analysis." ACM Transactions on Graphics (TOG) 33.4 (2014): 1-12. (Year: 2014).*

(Continued)

*Primary Examiner* — Vu Nguyen
(74) *Attorney, Agent, or Firm* — Maier & Maier, PLLC (57) ABSTRACT

A generation method of a human body motion editing model, storage medium and electronic device. The method includes taking initial motion sequence, target object attributes and target motion sequence as training samples; inputting initial motion sequence and target object attribute into preset neural network model, obtaining generated motion sequence output by preset neural network model; training preset neural network model according to target motion sequence and generated motion sequence to obtain trained human body motion editing model. Through using intermotion motion sequence of person and object as training sample, human body motion style migration is realized only by utilizing object attributes, so human intervention amount in data preprocessing process is reduced, human-object intermotion movement matched with attributes can be cor- (Continued)

respondingly generated by applying different attributes of same object, and reuse value of motion capture data is improved.

9 Claims, 5 Drawing Sheets

(51) Int. Cl.
*G06T 13/40* (2011.01)
*G06T 17/00* (2006.01)

(56) References Cited

U.S. PATENT DOCUMENTS

2019/0114546 A1   4/2019  Anil et al.
2019/0295305 A1*  9/2019  Yang ..................... G06N 3/088

OTHER PUBLICATIONS

International Search Report dated Apr. 22, 2020 in corresponding International Application No. PCT/CN2019/102937; 6 pages.

* cited by examiner

```
┌─────────────────────────────────────────────────────────────┐
│  inputting the initial motion sequence into the encoder, and│ ─ S21
│  obtaining a hidden feature corresponding to the initial motion│
│           sequence through the encoder                       │
└─────────────────────────────────────────────────────────────┘
                              │
                              ▼
┌─────────────────────────────────────────────────────────────┐
│  inputting the hidden feature and the target object attribute into│ ─ S22
│  the decoder, before outputting the generated motion sequence│
│  corresponding to the target object attribute through the decoder│
└─────────────────────────────────────────────────────────────┘
```

GENERATION METHOD OF HUMAN BODY MOTION EDITING MODEL, STORAGE MEDIUM AND ELECTRONIC DEVICE

CROSS-REFERENCE TO RELATED APPLICATIONS

This application is a national stage application of PCT Patent Application No. PCT/CN2019/102937, filed on Aug. 28, 2019, which claims priority to Chinese Patent Application No. 201910669994.9, filed on Jul. 23, 2019, the content of all of which is incorporated herein by reference.

FIELD OF THE INVENTION

The present disclosure relates to the technical field of computer graphics, and, more particularly, to a generation method of a human body motion editing model, a storage medium and an electronic device thereof.

BACKGROUND

At present, a motion capture technology adopts a software and hardware combining system to record real motion information of a human body, it is possible to obtain a smooth, natural and delicate motion of a character, before copying a motion process to a virtual person or character to generate a realistic character animation. Therefore, with an increasing demand for a plurality of 3D animated characters in a plurality of movies, games, and entertainment, a motion capture has become a hot spot in a computer graphics research. However, the motion capture is a targeted motion capture for a specific character in a specific environment, and when a scene or a creative purpose changes, it is necessary to recapture a new motion or re-adjust an original data frame by frame. This not only wastes a plurality of time and money, but also requires consuming a plurality of manpower.

In order to solve a plurality of problems existing in the motion capture technology, a data-driven motion synthesis has also become a hot topic for a plurality of researchers. However, a data-driven method commonly used in the prior art requires a large amount of manual data preprocessing, including a motion segmentation, an alignment, and a marking. During a process of the manual data preprocessing, an error at any one stage may easily lead to a failure of a final animation, and it is impossible to ensure an output of a smooth and natural motion animation.

SUMMARY

According to the above described defects, the purpose of the present disclosure is providing a generation method of a human body motion editing model, a storage medium and an electronic device thereof.

A technical solution of the present disclosure to solve the technical problems is as follows:

A generation method of a human body motion editing model, wherein comprising:

obtaining a training sample set, the training sample set comprises a plurality of groups of training samples, each group of training samples comprises an initial motion sequence, a target object attribute, and a target motion sequence, wherein the initial motion sequence comprises a motion sequence of a human body interacting with the object, the object has a plurality of initial object attributes configured;

inputting the initial motion sequence and the target object attribute of the training sample set into a preset neural network model, and obtaining a generated motion sequence corresponding to the target object attribute output by the preset neural network model;

correcting a plurality of model parameters of the preset neural network model, according to the target motion sequence and the generated motion sequence, until a training situation of the preset neural network model meets a plurality of preset conditions, to obtain the human body motion edit model having been trained.

The generation method of the human body motion editing model, wherein the initial intermotion sequence comprises a preset number of skeleton sequence frames, and each skeleton sequence frame comprises human skeleton sequence data, wherein the human skeleton sequence data comprises a joints position of a plurality of human body joints, a global speed of a root node of human bone and a gait information of a footstep.

The generation method of the human body motion editing model, wherein before the step of inputting the initial motion sequence and the target object attribute of the training sample set into the preset neural network model, and obtaining the generated motion sequence corresponding to the target object attribute output by the preset neural network model, comprising:

mapping a plurality of human body joints of the human body corresponding to the motion sequence corresponding to each sequence sample to a preset bone, to redirect the human body joints.

The generation method of the human body motion editing model, wherein the preset neural network model comprises an encoder and a decoder, the step of inputting the initial motion sequence and the target object attribute of the training sample set into the preset neural network model, and obtaining the generated motion sequence corresponding to the target object attribute output by the preset neural network model, comprising:

inputting the initial motion sequence into the encoder, and obtaining a hidden feature corresponding to the initial motion sequence through the encoder;

inputting the hidden feature and the target object attribute into the decoder, before outputting the generated motion sequence corresponding to the target object attribute through the decoder.

The generation method of the human body motion editing model, wherein the step of correcting the model parameters of the preset neural network model, according to the target motion sequence and the generated motion sequence, until the training situation of the preset neural network model meets the preset conditions, to obtain the human body motion edit model having been trained, comprising:

calculating a reconstruction loss function value and a comparison loss function value corresponding to the preset neural network model according to the target motion sequence and the generated motion sequence;

calculating a loss function value of the preset neural network model according to the reconstruction loss function value and the comparison loss function value;

correcting the model parameters of the preset neural network model according to the loss function value, until the training condition of the preset neural network model meets the preset conditions, to obtain the human body motion editing model having been trained.

The generation method of the human body motion editing model, wherein an expression of the contrast loss function is:

$$L_{ctr}(E)=E_{x,x^+x^-}[\|E(x)-E(x^+)\|_2^2-\|E(x)-E(x^-)\|_2^2+\alpha]_+$$

wherein E represents the encoder, x represents the initial motion sequence, $x^+$ represents a first initial motion sequence, $x^-$ represents a second initial motion sequence, and α represents an adjustment parameter, wherein the human body corresponding to the first initial motion sequence is as same as the initial sequence, and the object attribute corresponding to the first initial motion sequence is different from the initial motion sequence, while the human body corresponding to the second motion sequence is different from the initial sequence, and the object attribute corresponding to the second motion sequence is as same as the initial motion sequence.

The generation method of the human body motion editing model, wherein an expression of the reconstruction loss function is:

$$L_{rec}(E,D)=E_{x,y'}\|(D(E_{(x)},y')-\hat{x})\|_2^2$$

wherein E represents the encoder, x represents the initial motion sequence, $E_{(x)}$ represents a hidden feature obtained by the initial motion sequence through the encoder, $D(E_{(x)}, y')$ represents the generated motion sequence, $\hat{x}$ represents the target motion sequence, D represents the decoder.

A synthesis method for a human body motion based on an object attribute, wherein applying any of the human body motion editing models described above, the method comprises:

acquiring a target object attribute and an initial motion sequence, wherein the initial motion sequence comprises a motion sequence of a human body interacting with an object corresponding to the target object attribute, wherein configuring the initial object attribute to the object corresponding to the target object attribute;

inputting the target object attribute and the initial motion sequence into a human body motion editing model having been trained, and synthesizing the target motion sequence corresponding to the target object attribute through the human body motion editing model.

A computer-readable storage medium, wherein the computer-readable storage medium has one or more programs stored, and the one or more programs may be executed by one or more processors, to realize anyone of the steps in the generation method of the human body motion editing model described above, or the steps in the synthesis method for the human body motion model based on the object attribute described above.

An electronic device, wherein comprising: a processor, a memory, and a communication bus; the memory has a computer-readable program executed by the processor stored;

the communication bus realizes a connecting communication between the processor and the memory;

the processor executes the computer-readable program, to realize the steps in the generation method of the human body motion editing model described above, or the steps in the synthesis method for the human body motion model based on the object attribute described above.

Benefits: comparing with the prior art, the present disclosure provides a generation method of a human body motion editing model, a storage medium and an electronic device thereof. The method comprises: obtaining a training sample set, the training sample set comprises a plurality of groups of training samples, each group of training samples comprises an initial motion sequence, a target object attribute, and a target motion sequence; inputting the initial motion sequence and the target object attribute of the training sample set into a preset neural network model, and obtaining a generated motion sequence corresponding to the target object attribute output by the preset neural network model; correcting a plurality of model parameters of the preset neural network model, according to the target motion sequence and the generated motion sequence, until a training situation of the preset neural network model meets a plurality of preset conditions, to obtain the human body motion edit model having been trained. The present disclosure adopts an interactive motion sequence between the human body and the object as the sequence sample, making the human body motion editing model realize a human body motion style transfer by the object attributes only, which not only reduces an amount of human intervention in a data preprocessing process, but also by applying different target object attributes of a same object, it is possible to generate an interactive motion between a person matching an attribute and an object, which greatly improves a reuse value of a motion capture data.

DETAILED DESCRIPTION OF EMBODIMENTS

The present discloser provides a generation method of a human body motion editing model, a storage medium and an electronic device thereof, in order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Those skilled in the art can understand that, unless specifically stated, the singular forms of "a", "an", "said" and "the" used herein may also include a plural form. It should be further understood that the term "comprising" used in the specification of the present disclosure refers to a presence of described features, integers, steps, operations, elements and/or components, without excluding a presence or addition of one or more other features, Integers, steps, operations, elements, components, and/or groups thereof. It should be understood that when we refer to an element as being "connected" or "coupled" to another element, it can be directly connected or coupled to the other element, or an intervening element may also be present. In addition, "connection" or "coupling" used herein may include wireless connection or wireless coupling. The term "and/or" as used herein includes all of one or more of all or a combination of any units and all associated listed items.

Those skilled in the art can understand that, unless otherwise defined, all terms (including technical terms and scientific terms) used herein have a same meaning as those commonly understood by those of ordinary skill in the art to which the present disclosure belongs. It should also be understood that terms such as those defined in a general dictionary should be understood to have a meaning consistent with the meaning in the context of the prior art, and unless being specifically defined as here, they will not be explained by an idealized or overly formal meaning.

Further explanations on the content of the present disclosure are stated hereafter, by a description to a plurality of embodiments in conjunction with a plurality of accompanying drawings.

Figure 1:
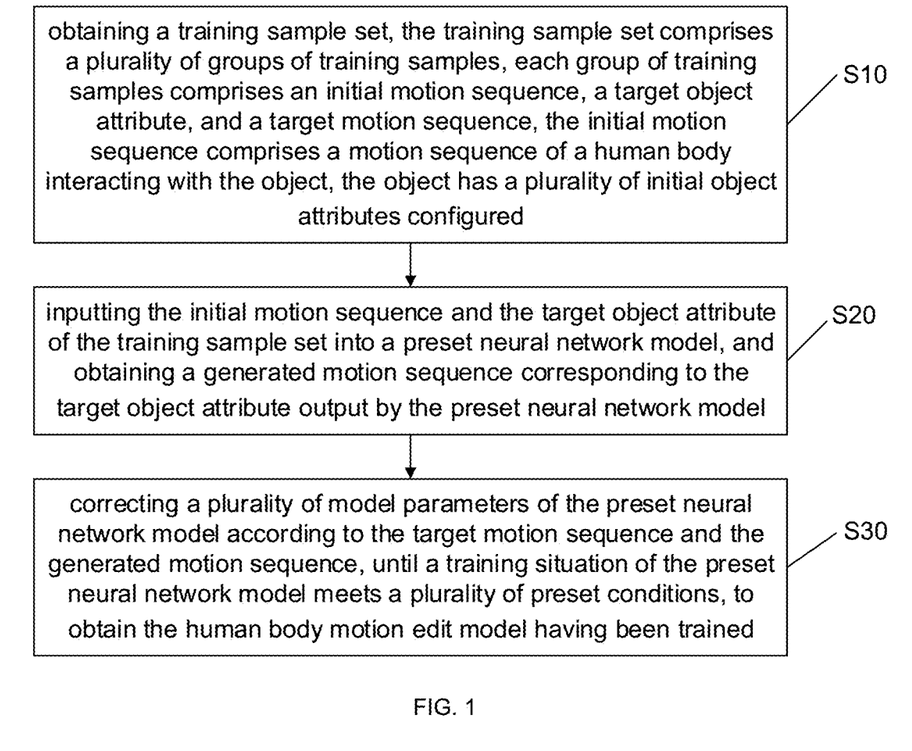
FIG. 1 illustrates a flowchart on the generation method of the human body motion editing model provided by the present disclosure.
Figure 2:
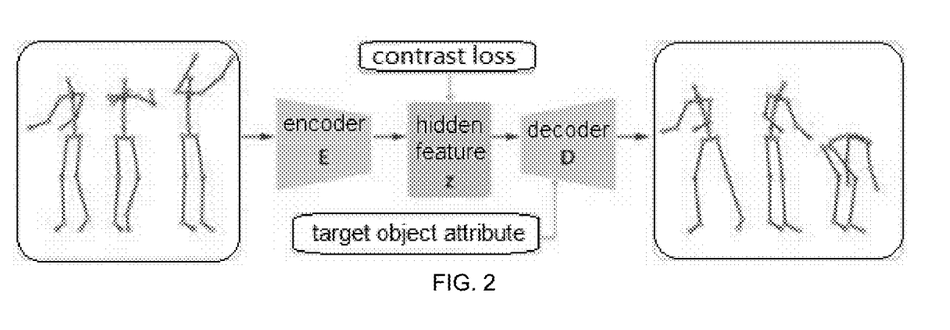
FIG. 2 illustrates a schematic flowchart on the generation method of the human body motion editing model provided by the present disclosure.

The present embodiment provides a generation method of a human body motion editing model, shown as FIG. 1 and FIG. 2, the method comprises:

S10. obtaining a training sample set, the training sample set comprises a plurality of groups of training samples, each group of training samples comprises an initial motion sequence, a target object attribute, and a target motion sequence, wherein the initial motion sequence comprises a motion sequence of a human body interacting with an object, the object has a plurality of initial object attributes configured.

The initial motion sequence is a motion sequence formed by the human body interacting with the object, and the object interacting with the human body in the initial motion sequence is as same as the object corresponding to the target object attribute, while differs in an object attribute only. In an embodiment, the initial motion sequence is a motion sequence of a human body moving a box with a weight of 5 kg, the box weights 5 kg, the target object attribute is 10 kg, and the target interactive motion is a motion sequence of a human body moving a 10 kg box. In other words, the object corresponding to the initial motion sequence is as same as the object corresponding to the target motion sequence, and a difference between the initial motion sequence and the target motion sequence is that the weight of the object corresponding to the initial motion sequence is different from the weight of the object corresponding to the target motion sequence.

Further, in an implementation of the present embodiment, the training sample set may comprise a plurality of interactive motions of the human body interacting with a plurality of objects, and the interactive motions may comprise walking, fishing, dumping, bending an arm machine, sitting down, and taking water, moving boxes and moving bowls, and more, while each interactive motion corresponds to a different object attribute.

In an embodiment, the interactive motion is a motion of taking water, the object is a water cup, and the object attribute is a volume of the water, the intermotion between the human body and the water cup is lifting the water cup and taking a sip of water before putting it down. Wherein the object attribute comprises: the volume of the water equals to the volume of the water cup, the volume of the water equals to half of the volume of the cup, and the volume of the water is zero. In the present embodiment, the initial motion sequence is that the human body taking water in a cup with a volume as same as the volume of the cup, the target object attribute is that the volume of the water equals to half the volume of the cup, the target motion sequence is that the human body taking water in a cup with a water volume half the volume of the cup.

In another embodiment, the interactive motion is a motion of moving a box, the object is the box, the object attribute is a weight of the box, and the interactive motion between the human body and the box is that the human body moves the box continuously to four different heights. The four heights are: moving the box from ground to a sofa, moving the box from the sofa to a desk, moving the box from the desk to a top of a bookcase, and moving from the top of the bookcase to the ground again, respectively. A weight of the box is 0 kg, 5 kg, 10 kg, 15 kg, 20 kg and 25 kg respectively. In the present embodiment, the initial motion sequence is that the human body moves a 5 kg box to four different heights continuously, the target object attribute is 10 kg, and the target motion sequence is that the human body moves a 10 kg box to four different heights continuously.

Figure 3:
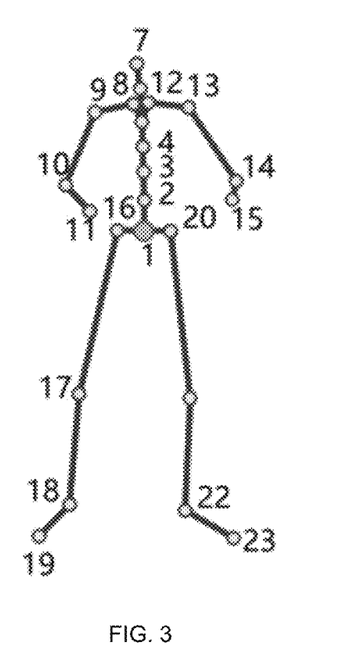
FIG. 3 illustrates a schematic diagram on human body joints in the generation method of the human body motion editing model provided by the present disclosure.

Further, in an implementation of the present embodiment, in order to facilitate learning an interactive motion sequence, the initial intermotion sequence comprises a preset number of skeleton sequence frames, and each skeleton sequence frame comprises a plurality of human skeleton sequence data, wherein the human skeleton sequence data comprises a joints position of a plurality of human body joints, a global speed of a root node of a human bone and a gait information of a footstep. The joints positions of the human body joints are a three-dimensional data, while the human body joints positions are defined in a human body local coordinate system, as shown in FIG. 3, an origin of the human body local coordinate system locates at a projection of the root node to the ground, and a Z-axis direction is a body forward direction, while a direction vertical to the ground is a Y-axis direction, and a horizontal direction is an X-axis direction, the root node is obtained by an outer product from a vector average of shoulder joint vectors formed by the left shoulder joint and the right shoulder joint, and a hip joint vector formed by two hip joints, to a unit vector vertical to a top surface direction, so it is possible to ignore a global motion of the pelvis, and reduce a complexity of the human skeleton sequence data. In addition, the global speed of the human skeleton is a speed on the XZ plane, and a rotation speed is the rotation speed around the vertical axis (Y axis). Thus the human skeleton sequence data comprises a joint relative information and a global information, and both the joint relative information and the global information are integrated over time, to restore an overall translation and rotation of a motion. At a same time, an Euclidean distance between a plurality of postures corresponding to each human skeleton sequence is very consistent with a visual difference of the postures, while a plurality of postures can be obtained by a simple linear interpolation. In addition, when a toe or a back of a person's foot is below a certain height and speed, it is possible to obtain a label of the foot touches the ground by detection, and the label of the foot touches the ground may also be added to the human skeleton data.

At the same time, in the present embodiment, the preset number of skeleton sequence frames is obtained by processing a plurality of human body exchange animations acquired, and the human body exchange animation may be obtained through a motion capture device. In an embodiment, the human body may wear an MVN inertial motion capture suit, to capture a plurality of human body motion through the MVN inertial motion capture suit, before saving in a form of a three-dimensional skeleton sequence; the human body may wear a sports camera on his head and record a plurality of first-view video thereof. In addition, around the human body, there are three cameras arranged, to record three videos in different perspectives through the three cameras, that may make the training samples comprise the three-dimensional skeleton motion sequence, a RGB video corresponding to the three-dimensional skeleton motion sequence, and the object attributes of an interactive object, wherein the object attributes may comprise weight, length, volume, and hardness.

Further, in order to improve a convergence speed of the human body motion editing model, after obtaining the training samples, the training samples may be redirected so that the bone lengths of the corresponding bones in the human bones corresponding to the training samples are equal. Correspondingly, before a step of inputting the initial motion sequence and the target object attribute of the training sample set into the preset neural network model, and obtaining the generated motion sequence corresponding to the target object attribute output by the preset neural network model, comprising: mapping a plurality of human body joints of the human body corresponding to the motion sequence corresponding to each sequence sample to a preset bone, to redirect the human body joints. Thus by mapping the human body joints contained in each training sample to a same skeleton, each joint of each bone motion has a same length, and different sizes of the human body will eventually be scaled to a same scale, which may improve the convergence rate of the human body motion editing model.

S20, inputting the initial motion sequence and the target object attribute of the training sample set into a preset neural network model, and obtaining a generated motion sequence corresponding to the target object attribute output by the preset neural network model.

Figure 4:
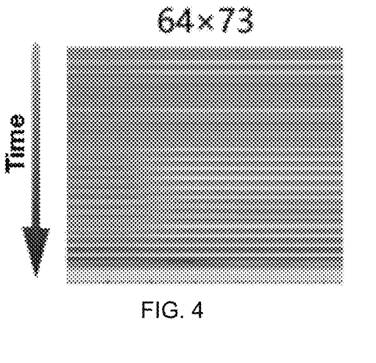
FIG. 4 illustrates a schematic diagram on an expression form of the initial motion sequence in the generation method of the human body motion editing model provided by the present disclosure.

The initial motion sequences in the training sample set are all 64 frames, and the initial motion sequences are input to the preset neural network model in a form of vectors, wherein an input vector corresponding to the initial motion sequences has a form of $X \in R^{n*d}$, n represents a number of the frames, and d represents a dimension represented by a joint input. A representation form of the initial motion sequence may be shown as FIG. 4, the initial motion sequence is input into the preset neural network model in a time sequence.

Figure 5:
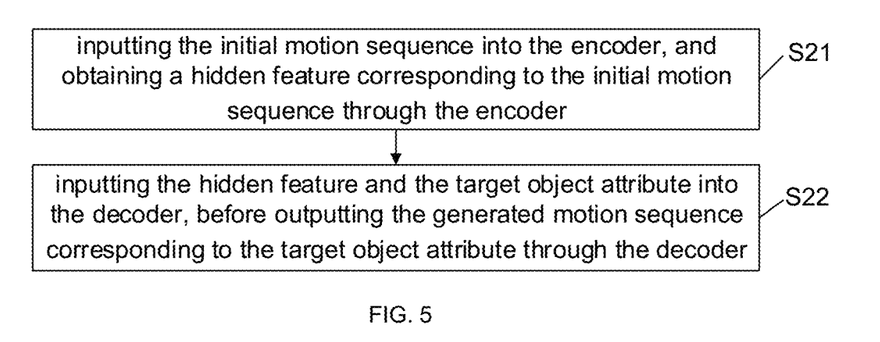
FIG. 5 illustrates a schematic flowchart on step S20 in the generation method of the human body motion editing model provided by the present disclosure.

Further, in an implementation of the present embodiment, the preset neural network model comprises an encoder and a decoder, the encoder is applied to encoding the initial motion sequence being input into a hidden space to obtain a characterized vector, the decoder is applied to synthesizing the generated motion sequence corresponding to the target object attributes based on the characterized vector and the target object attribute. Accordingly, shown as FIG. 5, the preset neural network model comprises an encoder and a decoder, the step of inputting the initial motion sequence and the target object attribute of the training sample set into the preset neural network model, and obtaining the generated motion sequence corresponding to the target object attribute output by the preset neural network model, comprising:

S21, inputting the initial motion sequence into the encoder, and obtaining a hidden feature corresponding to the initial motion sequence through the encoder;

S22, inputting the hidden feature and the target object attribute into the decoder, before outputting the generated motion sequence corresponding to the target object attribute through the decoder.

Figure 6:
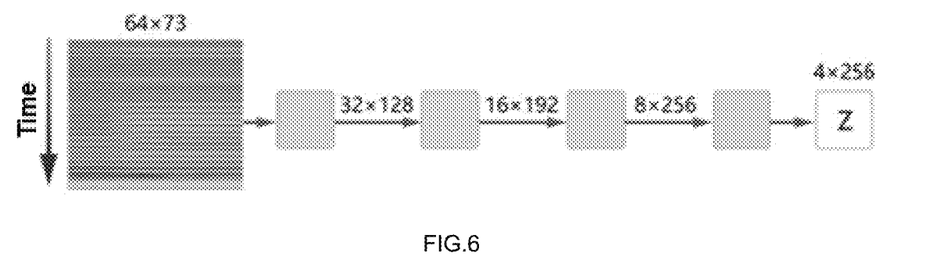
FIG. 6 illustrates a schematic diagram on a decoder of a preset neural network provided by the present disclosure.

The encoder comprises four coding layers, and each coding layer comprises a one-dimensional convolutional layer, a maximum pooling layer, and a LeakyReLU layer. As shown in FIG. 6, an input item of a first coding layer is a visible space vector X, and the X has a dimension of 64*73, and an output item of the first coding layer is a feature vector with a dimension of 32*128. An input item of a second coding layer is the feature vector with the dimension of 32*128, an output item of the second coding layer is a feature vector with a dimension of 16*192. An input item of a third coding layer is the feature vector with the dimension of 16*192, an output item of the third coding layer is a feature vector with a dimension of 8*256. An input item of a forth coding layer is the feature vector with the dimension of 8*256, an output item of the fourth coding layer is a feature vector with a dimension of 4*256. Therefore, after inputting the initial motion sequence into the encoder, a feature vector with a dimension of 4*256 will be obtained through the encoder, wherein the feature vector is a hidden space vector.

In addition, in the present embodiment, from the first coding layer to the fourth coding layer, a size of a convolution kernel of the one-dimensional convolutional layer is 8, and a step size is 2, the one-dimensional convolutional layer is applied for a convolution on a dimension of time, to compress an information of the interactive motion sequence from the dimension of time. The maximum pooling layer is applied to returning a maximum value of each pair of consecutive hidden units on a time axis, to ensure that a feature to learn is mainly focused on a representative characteristic. An activation function of the LeakyReLU layer adopts LeakeyReLU, to reduce overfitting, thereby reducing a complexity of a calculation.

Figure 7:
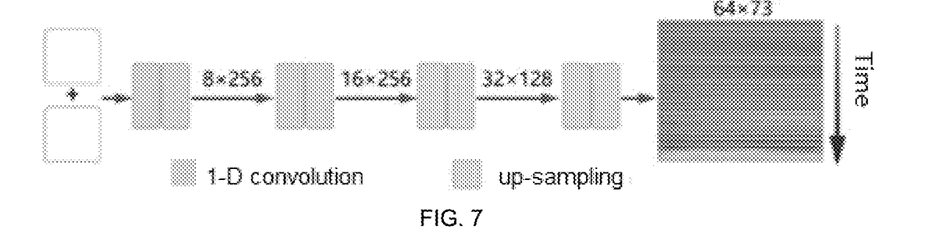
FIG. 7 illustrates a schematic diagram on an encoder of a preset neural network provided by the present disclosure.

Further, in an implementation of the present embodiment, the decoder comprises four decoding layers, which are denoted respectively as a first decoding layer, a second decoding layer, a third decoding layer, and a fourth decoding layer. From the first decoding layer to the fourth decoding layer, each layer comprises a one-dimensional convolutional layer and an up-sampling layer. As shown in FIG. 7, an input item of the first decoding layer is a feature vector of 4*256 and the target object attributes, an output item of the first decoding layer is a feature vector having a dimension of 8*256, an input item of the second decoding layer is the feature vector having the dimension of 8*256, an output item of the second decoding layer is a feature vector having a dimension of 16*256, an input item of the third decoding layer is the feature vector having the dimension of 16*256, an output item of the third decoding layer is a feature vector having a dimension of 32*128, an input item of the fourth decoding layer is the feature vector having the dimension of 32*128, an output item of the fourth decoding layer is a feature vector with a dimension of the generated motion sequence. Therefore, by inputting the hidden features and the target object attributes into the decoder, the generated motion sequence corresponding to the target object attributes may be output by the decoder.

S30, correcting a plurality of model parameters of the preset neural network model, according to the target motion sequence and the generated motion sequence, until a training situation of the preset neural network model meets a plurality of preset conditions, to obtain the human body motion edit model having been trained.

The preset condition comprises that a loss value meets a preset requirement or a number of training times reaches a preset number of times. The preset requirement may be determined according to an accuracy of the human body motion editing model, which will not be described in details here. The preset number of times may be a maximum number of training times of the preset neural network, for example, 1000 times or else. Therefore, outputting the generated motion sequence from the preset neural network, and calculating the loss value of the preset neural network according to the generated motion sequence and the target motion sequence. After calculating and obtaining the loss value, the loss value is judged to decide if it has met a preset requirement: if the loss value has met the preset requirement, the training will be finished; if the loss value has not met the preset requirement, then whether the training times of the preset neural network has reached the preset number of times is judged, and if the preset number of times is not reached, then the network parameters of the preset neural network are corrected according to the loss value; if the preset number of times is reached, the training ends. Thus judging whether training the preset neural network shall be completed or not by the loss value and the number of training times, may avoid the training of the preset neural network from reaching an infinite loop due to the loss value impossible to meet the preset requirement.

Figure 8:
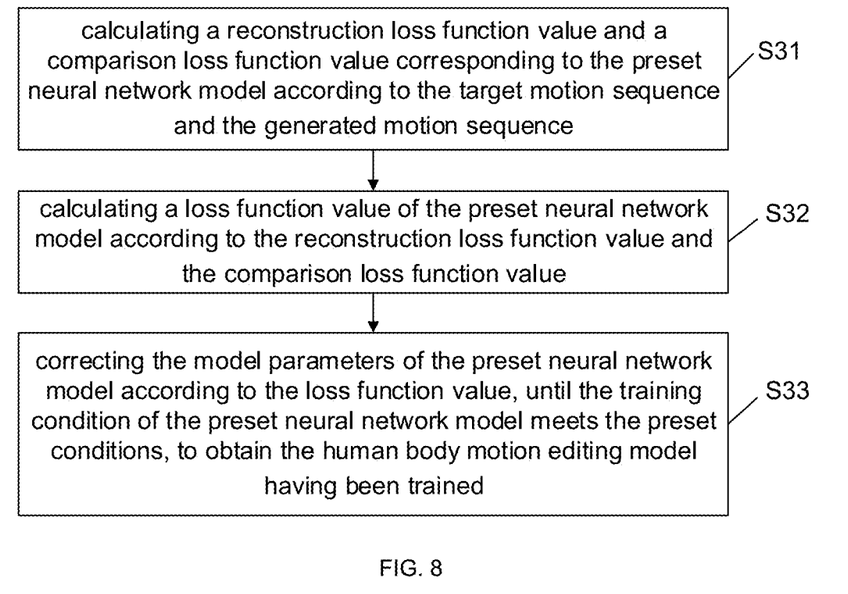
FIG. 8 illustrates a schematic flowchart on step S30 in the generation method of the human body motion editing model provided by the present disclosure.

Further, in an implementation of the present embodiment, shown as FIG. 8, the step of correcting a plurality of model parameters of the preset neural network model, according to the target motion sequence and the generated motion sequence, until a training situation of the preset neural network model meets a plurality of preset conditions, to obtain the human body motion edit model having been trained, comprises specifically:

S31: calculating a reconstruction loss function value and a contrast loss function value corresponding to the preset neural network model according to the target motion sequence and the generated motion sequence;

S32: calculating a loss function value of the preset neural network model according to the reconstruction loss function value and the contrast loss function value;

S33: correcting the model parameters of the preset neural network model according to the loss function value, until the training situation of the preset neural network model meets the preset conditions, to obtain the human body motion edit model having been trained.

The reconstruction loss function is applied to constraining the encoder and the decoder, and the reconstruction loss function calculates the loss value of the generated motion sequence relative to the target motion sequence. In the present embodiment, an expression of the reconstruction loss function is:

$$L_{rec}(E,D)=E_{x,y'}\|(D(E_{(x)},y')-\hat{x})\|_2^2$$

Wherein, E represents the encoder, x represents the initial motion sequence, $E_{(x)}$ represents the hidden features obtained by the initial motion sequence through the encoder, $D(E_{(x)},y')$ represents the generated motion sequence, $\hat{x}$ represents the target motion sequence, D represents the decoder.

In addition, the contrast loss function is applied to constraining a residual information of the hidden feature output from the encoder to the initial object attribute corresponding to the input initial intermotion motion. In the present embodiment, in order to better facilitate separating a plurality of information related to the object attributes from the hidden features, it is possible to constrain a distance in the hidden space between two different motion samples. Therefore, for each training sample x, randomly finding a sample from the training samples that is same as the human body corresponding to x but different to the object attributes, before regarding as a positive sample $x^+$; at a same time, randomly finding a sample from the training samples that is same as the object attributes corresponding to x but different to the human body, before regarding as a negative sample $x^-$, assuming that a difference of the distance between the x and the $x^-$ in the hidden space to the distance between the x and the $x^+$ in the hidden space is $\alpha$, then an expression of the contrast loss function is:

$$L_{ctr}(E)=E_{x,x^+,x^-}[\|E(x)-E(x^+)\|_2^2-E(x)-\|E(x^-)\|_2^2+\alpha]_+$$

wherein E represents the encoder, x represents the initial motion sequence, $x^+$ represents a first initial motion sequence, $x^-$ represents a second initial motion sequence, and $\alpha$ represents an adjustment parameter, wherein the human body corresponding to the first initial motion sequence is as same as the initial sequence, and the object attribute corresponding to the first initial motion sequence is different from the initial motion sequence, while the human body corresponding to the second motion sequence is different from the initial sequence, and the object attribute corresponding to the second initial motion sequence is same as the initial motion sequence.

Further, the human body motion editing model generated by the generation method of the human body motion editing model provided by the present embodiment is described hereafter, combining with an embodiment.

EMBODIMENTS

Figure 9A:
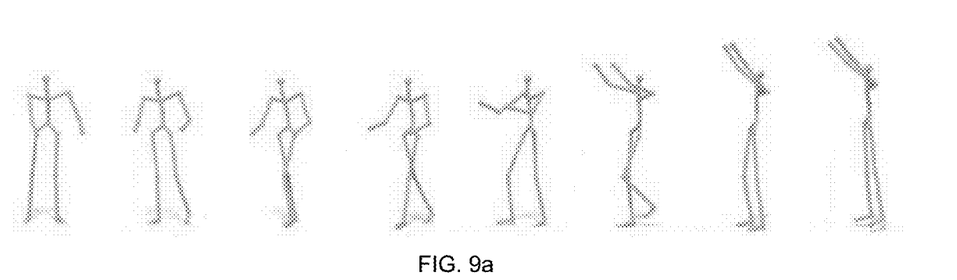
FIG. 9a illustrates an initial motion sequence in embodiment 1 in the generation method of the human body motion editing model provided by the present disclosure.
Figure 9B:
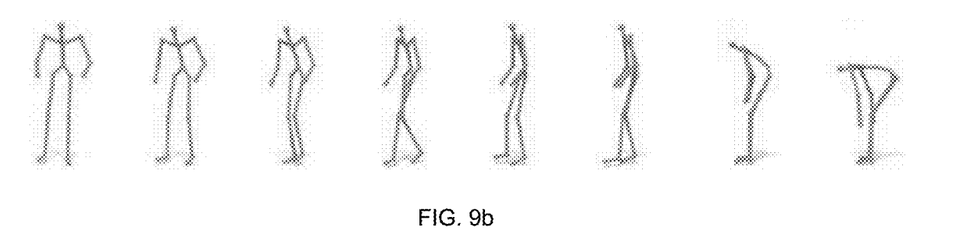
FIG. 9b illustrates a generated motion sequence in embodiment 1 in the generation method of the human body motion editing model provided by the present disclosure.

Embodiment 1: shown as FIG. 9a, the initial motion sequence is a motion sequence of a participant moving a box of 0 kg from a table to a cabinet. As shown in FIG. 9b, when the target object attribute is 25 kg, the generated motion sequence of the participant moving a box of 25 kg from the table to the cabinet, output and obtained from the human body motion editing model, makes the participant impossible to move the box to the cabinet, as shown in FIG. 9b of the generated motion sequence.

Figure 10A:
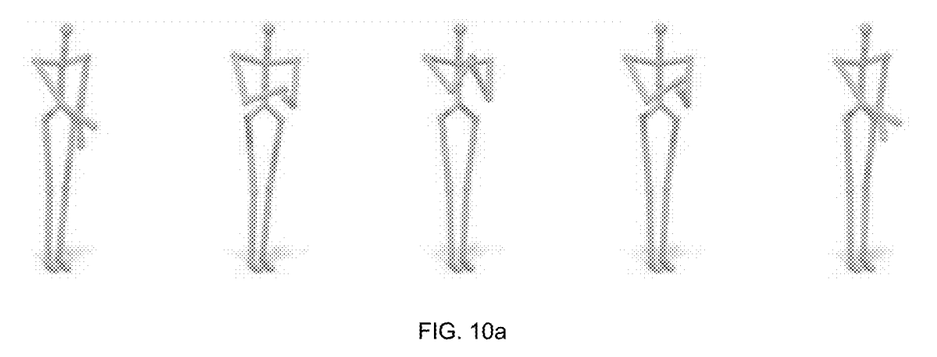
FIG. 10a illustrates an initial motion sequence in embodiment 2 in the generation method of the human body motion editing model provided by the present disclosure.
Figure 10B:
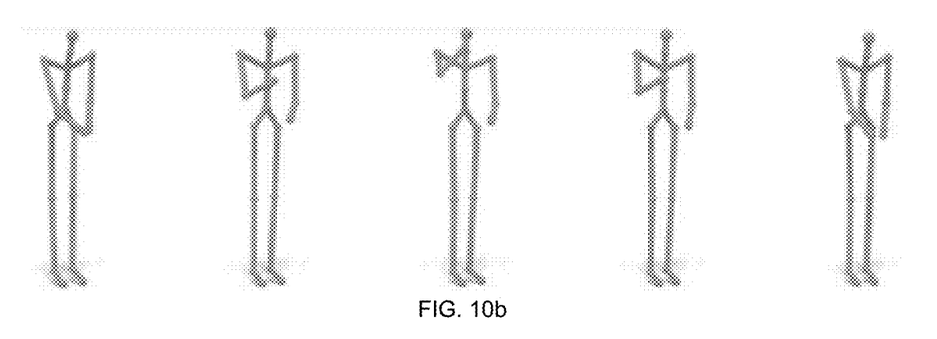
FIG. 10b illustrates a generated motion sequence in embodiment 2 in the generation method of the human body motion editing model provided by the present disclosure.

Embodiment 2: As shown in FIG. 10a, the initial motion sequence is a motion sequence in which the participant picks up a cup with a volume of water equal to a volume of the cup and drinks water. Shown as FIG. 10b, when the target object attribute is that the volume of water in the cup is 0, the human body motion editing model outputs the generated motion sequence of the participant holding by hand a cup with a volume of water equal to 0 and drinking water. From the generated motion sequence shown in FIG. 10b, when the participant drinking water, an arm needs to be raised.

Based on the generation method of human body motion editing model, described above, the present disclosure further provides a synthesis method for a human body motion based on the object attribute, which applies the human body motion editing model described in the embodiment above, the method comprises:

acquiring a target object attribute and an initial motion sequence, wherein the initial motion sequence comprises a motion sequence of a human body interacting with an object corresponding to the target object attribute, wherein configuring the initial object attribute to the object corresponding to the target object attribute;

inputting the target object attribute and the initial motion sequence into a human body motion editing model having been trained, and synthesizing the target motion sequence corresponding to the target object attribute through the human body motion editing model.

Based on the generation method of human body motion editing model and based on the synthesis method for the human body motion based on the object altitude described above, the present disclosure further provides a computer-readable storage medium, wherein the computer-readable storage medium has one or more programs stored, and the one or more programs may be executed by one or more processors, to realize anyone of the steps in the embodiments on the generation method of the human body motion editing model described above, or the steps in the embodiments on the synthesis method for the human body motion model based on the object attribute described above.

Figure 11:
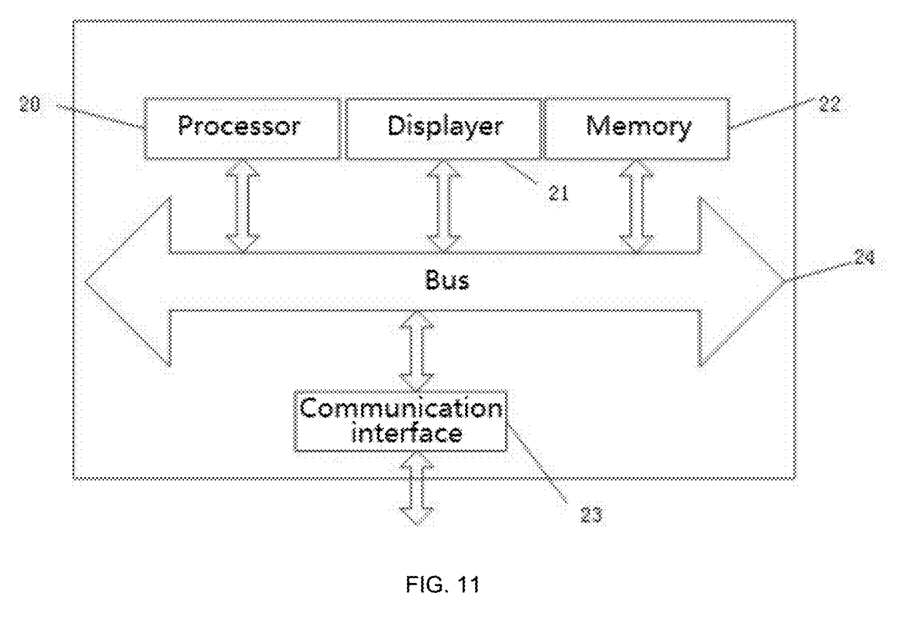
FIG. 11 illustrates a schematic structural diagram on an electronic device provided by the present disclosure.

Based on the generation method of human body motion editing model and based on the synthesis method for the human body motion based on the object altitude described above, the present disclosure further provides an electronic device, shown as FIG. 11, comprising: a processor 20, a displayer 21, and a memory 22, which may further comprise a communication interface 23 and a bus 24. Wherein, the processor 20, the displayer 21, the memory 22 and the communication interface 23 may achieve a communication between each other through the bus 24. The displayer 21 is designed as displaying a preset user guidance interface in an initial setting mode. The communication interface 23 may transmit information. The processor 20 may call a plurality of logic instructions in the memory 22, to execute the methods in the embodiments described above.

In addition, the logic instructions in the memory 22 described above may be implemented in a form of a plurality of software functional units and when sold or used as an independent product, the logic instructions may be stored in a computer-readable storage medium.

The memory 22, as a computer-readable storage medium, may be configured to store a plurality of software programs and computer-executable programs, such as a plurality of program instructions or modules corresponding to the methods in the embodiments of the present disclosure. The processor 20 executes a plurality of functional applications and a data process by running a plurality of software programs, instructions or modules stored in the memory 22, that is, achieving the methods in the embodiments described above.

The memory 22 may comprise a program storage area and a data storage area, wherein the program storage area may store an operating system and an application program required by at least one function; the data storage area may store data created according to a use of the terminal device and more. In addition, the memory 22 may comprise a high-speed random access memory, and may also comprise a non-volatile memory, including a plurality of media that can store program codes, including a U disk, a mobile hard disk, a read-only memory (ROM), a random access memory (RAM), a magnetic disk, an optical disk and more, the memory 22 may also be a plurality of temporary state storage media.

In addition, the storage media and the specific process of the processors loading and executing the multiple instructions in the electronic device has been described in details in the method described above, and will not be described herein again.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A generation method of a human body motion editing model, comprising:

obtaining a training sample set, the training sample set comprising a plurality of groups of training samples, each group of training samples comprising an initial motion sequence, a target object attribute, and a target motion sequence, the initial motion sequence comprising a motion sequence of a human body interacting with the object, and the object has a plurality of initial object attributes configured;

inputting the initial motion sequence and the target object attribute of the training sample set into a preset neural network model, and obtaining a generated motion sequence corresponding to the target object attribute output by the preset neural network model; and correcting a plurality of model parameters of the preset neural network model according to the target motion sequence and the generated motion sequence until a training situation of the preset neural network model meets a plurality of preset conditions, to obtain the human body motion edit model having been trained.

2. The generation method of the human body motion editing model according to claim 1, wherein an initial motion sequence comprises a preset number of skeleton sequence frames, and each skeleton sequence frame comprises human skeleton sequence data, the human skeleton sequence data comprises a joints position of a plurality of human body joints, a global speed of a root node of human bone and a gait information of a footstep.

3. The generation method of the human body motion editing model according to claim 2, wherein the step of correcting the model parameters of the preset neural network model according to the target motion sequence and the generated motion sequence, until the training situation of the preset neural network model meets the preset conditions, to obtain the human body motion edit model having been trained, comprises:

calculating a reconstruction loss function value and a comparison loss function value corresponding to the preset neural network model according to the target motion sequence and the generated motion sequence;

calculating a loss function value of the preset neural network model according to the reconstruction loss function value and the comparison loss function value; and correcting the model parameters of the preset neural network model according to the loss function value, until the training condition of the preset neural network model meets the preset conditions, to obtain the human body motion editing model having been trained.

4. The generation method of the human body motion editing model according to claim 3, wherein an expression of the contrast loss function is:

$$L_{ctr}(E)=E_{x,x^+,x^-}[\|E(x)-E(x^+)\|_2^2-\|E(x)-E(x^-)\|_2^2+\alpha]_+$$

wherein E represents the encoder, x represents the initial motion sequence, x⁺ represents a first initial motion sequence, x̂ represents a second initial motion sequence, and a represents an adjustment parameter, the human body corresponding to the first initial motion sequence is as same as the initial sequence, and the object attribute corresponding to the first initial motion sequence is different from the initial motion sequence, while the human body corresponding to the second motion sequence is different from the initial sequence, and the object attribute corresponding to the second motion sequence is as same as the initial motion sequence.

5. The generation method of the human body motion editing model according to claim 3, wherein, an expression of the reconstruction loss function is:

$$L_{rec}(E,D) = E_{x,y'} \|(D(E_{(x)}, y') - \hat{x})\|_2^2$$

wherein E represents the encoder, x represents the initial motion sequence, $E_{(x)}$ represents a hidden feature obtained by the initial motion sequence through the encoder, $D(E_{(x)}, y')$, represents the generated motion sequence, x̂ represents the target motion sequence, and D represents the decoder.

6. The generation method of the human body motion editing model according to claim 1, wherein, before the step of inputting the initial motion sequence and the target object attribute of the training sample set into the preset neural network model, and obtaining the generated motion sequence corresponding to the target object attribute output by the preset neural network model, the method comprises:
mapping a plurality of human body joints of the human body corresponding to the motion sequence corresponding to each sequence sample to a preset bone, to redirect the human body joints.

7. The generation method of the human body motion editing model according to claim 1, wherein the preset neural network model comprises an encoder and a decoder, and the step of inputting the initial motion sequence and the target object attribute of the training sample set into the preset neural network model, and obtaining the generated motion sequence corresponding to the target object attribute output by the preset neural network model, comprises:
inputting the initial motion sequence into the encoder, and obtaining a hidden feature corresponding to the initial motion sequence through the encoder; and
inputting the hidden feature and the target object attribute into the decoder, before outputting the generated motion sequence corresponding to the target object attribute through the decoder.

8. A synthesis method for a human body motion based on an object attribute, wherein applying the human body motion editing models according to claim 1, the method comprises:

acquiring a target object attribute and an initial motion sequence, the initial motion sequence comprises a motion sequence of a human body interacting with an object corresponding to the target object attribute, configuring the initial object attribute to the object corresponding to the target object attribute; and
inputting the target object attribute and the initial motion sequence into a human body motion editing model having been trained, and synthesizing the target motion sequence corresponding to the target object attribute through the human body motion editing model.

9. An electronic device, comprising: a processor, a memory, and a communication bus; the memory has a computer-readable program executed by the processor stored;
the communication bus realizes a connecting communication between the processor and the memory; and
the processor executes the computer-readable program to realize the steps in the generation method of the human body motion editing model, comprising:
obtaining a training sample set, the training sample set comprising a plurality of groups of training samples, each group of training samples comprising an initial motion sequence, a target object attribute, and a target motion sequence, the initial motion sequence comprising a motion sequence of a human body interacting with the object, and the object has a plurality of initial object attributes configured;
inputting the initial motion sequence and the target object attribute of the training sample set into a preset neural network model, and obtaining a generated motion sequence corresponding to the target object attribute output by the preset neural network model;
correcting a plurality of model parameters of the preset neural network model according to the target motion sequence and the generated motion sequence, until a training situation of the preset neural network model meets a plurality of preset conditions, to obtain the human body motion edit model having been trained; or
the processor executes the computer-readable program to realize the steps in the synthesis method for the human body motion model based on the object attribute, comprising:
acquiring a target object attribute and an initial motion sequence, the initial motion sequence comprises a motion sequence of a human body interacting with an object corresponding to the target object attribute, and configuring the initial object attribute to the object corresponding to the target object attribute; and
inputting the target object attribute and the initial motion sequence into a human body motion editing model having been trained, and synthesizing the target motion sequence corresponding to the target object attribute through the human body motion editing model.

* * * * *